United States Patent
Terada et al.

(10) Patent No.: US 6,539,802 B1
(45) Date of Patent: Apr. 1, 2003

(54) ANGULAR VELOCITY SENSOR

(75) Inventors: Jiro Terada, Osaka (JP); Masami Tamura, Kyoto (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/674,565

(22) PCT Filed: Feb. 28, 2000

(86) PCT No.: PCT/JP00/01136

§ 371 (c)(1),
(2), (4) Date: Dec. 21, 2000

(87) PCT Pub. No.: WO00/52421

PCT Pub. Date: Sep. 8, 2000

(30) Foreign Application Priority Data

Mar. 3, 1999 (JP) ............................... 11-055012

(51) Int. Cl.$^7$ ..................... C04B 35/00; H01L 41/187
(52) U.S. Cl. ............. 73/504.12; 310/358; 252/62.9 PZ; 501/134
(58) Field of Search ............... 73/504.02, 504.04, 73/504.12, 504.15, 504.16; 310/358; 252/62.9 PZ, 62.9 R; 501/134, 135, 136, 139

(56) References Cited

U.S. PATENT DOCUMENTS

| | | | | |
|---|---|---|---|---|
| 3,549,536 A | * | 12/1970 | Lungo et al. ............... | 106/39 |
| 3,856,693 A | * | 12/1974 | Kim ............................ | 252/62.9 |
| 4,490,641 A | * | 12/1984 | Takeuchi et al. ............ | 310/366 |
| 4,626,369 A | * | 12/1986 | Walker, Jr. .................. | 252/62.9 |
| 5,378,382 A | * | 1/1995 | Nishimura et al. ......... | 252/62.9 |
| 6,207,069 B1 | * | 3/2001 | Furukawa et al. ..... | 252/62.9 PZ |
| 6,207,070 B1 | * | 3/2001 | Sasaki et al. ......... | 252/62.9 PZ |

FOREIGN PATENT DOCUMENTS

| | | |
|---|---|---|
| EP | 0 679 866 | 11/1995 |
| EP | 0 844 461 | 5/1998 |
| JP | 49-28900 | 3/1974 |
| JP | 49-42638 | 11/1974 |
| JP | 53-142700 | * 12/1978 |
| JP | 57-68090 | * 4/1982 |
| JP | 61-253710 | * 11/1986 |
| JP | 63-151667 | * 6/1988 |
| JP | 63-166755 | * 7/1988 |
| JP | 63-166756 | * 7/1988 |
| JP | 4-270172 | 9/1992 |
| JP | 5-296770 | 11/1993 |
| JP | 7-206519 | 8/1995 |
| JP | 7-280571 | 10/1995 |
| JP | 10-287469 | 10/1998 |

* cited by examiner

*Primary Examiner*—Helen Kwok
(74) *Attorney, Agent, or Firm*—Wenderoth, Lind & Ponack, L.L.P.

(57) ABSTRACT

The invention provides an angular velocity sensor capable of obtaining vibration which is close to a linear-operation for a large amplitude input, and a high sensitivity at the same time. The sensor comprises a vibrator, which is made of a piezoelectric element having a perovskite crystal structure expressed as $ABO_3$, and 0.1–1.0 wt. % of $MnO_2$ is added to this piezoelectric element.

6 Claims, 10 Drawing Sheets

(a)

(b)

(c)

ANGULAR VELOCITY SENSOR

This application is a 371 of PCT/JP00/01136 filed Feb. 28, 2000.

TECHNICAL FIELD

The present invention relates to an angular velocity sensor employing a polycrystalline piezoelectric element.

BACKGROUND ART

In an angular velocity sensor known so far, a monocrystalline piezoelectric element is processed into a U-shaped tuning fork on which a driving electrode and a detecting electrode are attached. Such example is disclosed in Japanese Laid-open Patent No. 6-258333. A voltage is supplied to the driving electrode on this velocity sensor from a single driving power source, and an angular velocity signal is detected from the detecting electrode.

This angular velocity sensor requires a large electric power supply for enhancing a detecting sensitivity, and a large vibration amplitude must be generated. It is hence a problem that it is forced to use a nonlinear-operating-region, where the amount of dislocation due to vibration is unstable, of the piezoelectric element because of the large vibration amplitude, exceeding a linear-operating-region where the characteristic of the piezoelectric element is stable.

DISCLOSURE OF THE INVENTION

To solve the problem in the invention, a vibrator, which works as an inertia transducer by vibration and a Corioli's force detector, is constructed comprising a piezoelectric element having a perovskite crystal structure expressed as $ABO_3$, and the piezoelectric element includes 0.1 to 1.0 wt. % of $MnO_2$. In this structure, a large vibration amplitude close to linear operation are obtained, and a high sensitivity is simultaneously achieved.

BEST MODE FOR CARRYING OUT THE INVENTION (Embodiment 1)

Figure 1:
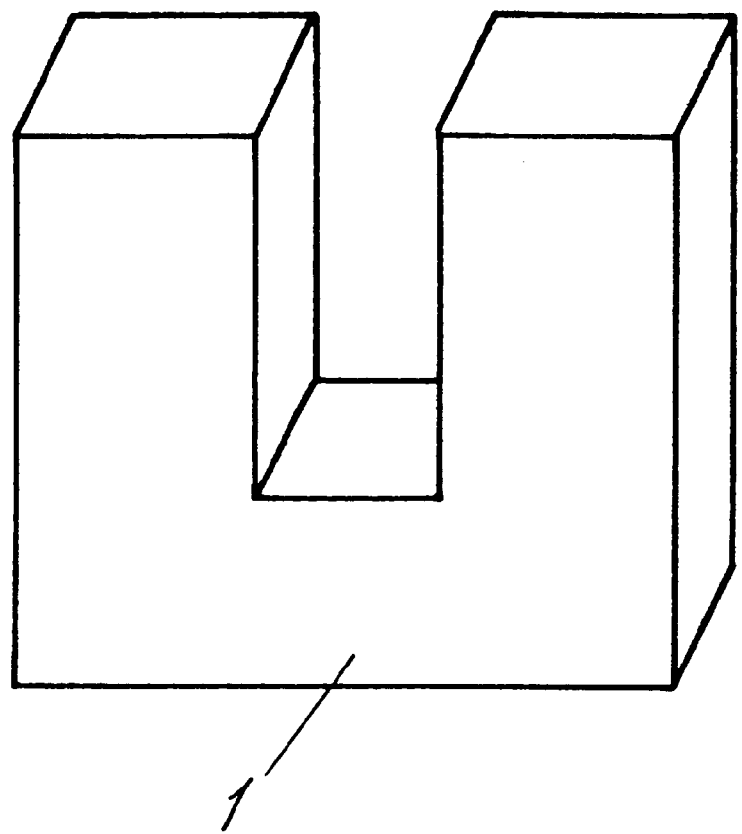
FIG. 1 is a perspective view of a tuning fork element for explaining the shape of the tuning fork element in embodiment 1 of the invention.
Figure 11:
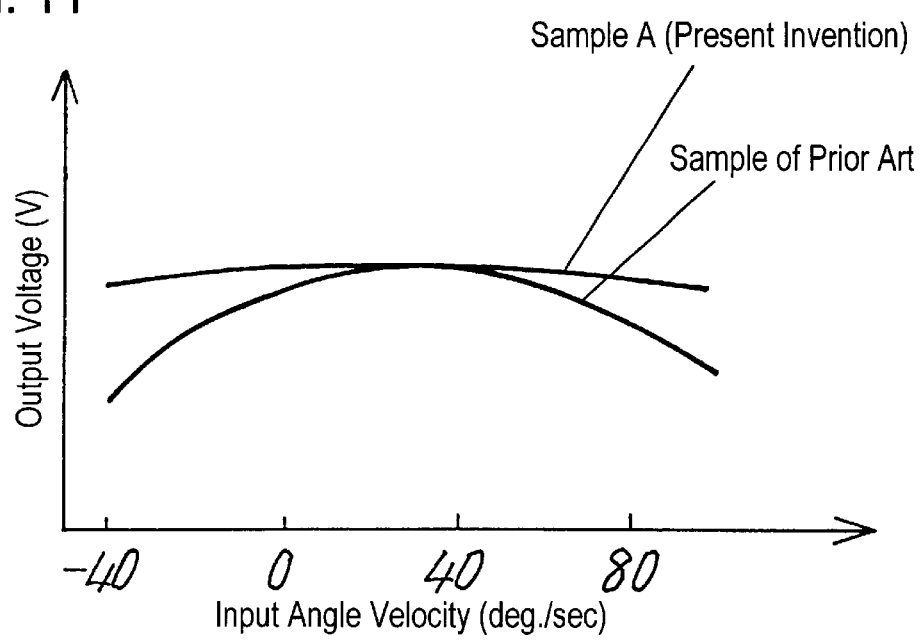
FIG. 11 is a temperature characteristic diagram of the angular velocity sensor in the embodiment.

FIG. 1 is a perspective view for explaining the shape of a tuning fork element in embodiment 1 for an angular velocity sensor of the invention. In FIG. 1, reference numeral 1 shows a tuning fork element. An outline of manufacturing method of the sample used as the tuning fork element 1 will be explained below. Including PbO (purity 99.9%), ZnO (purity 99.9%), $Nb_2O_5$ (purity 99.9%), $ZrO_2$ (purity 99.9%), and $TiO_2$ (purity 99.85%) of chemical reagent grade, the composition of $Pb[(Zn_{1/3}Nb_{2/3})_xZr_yTi_z]O_3$ (X+Y+Z=1) capable of lessening a characteristic change due to a temperature is used, in particular, $Pb[(Zn_{1/3}Nb_{2/3})_{0.125}Zr_{0.385}Ti_{0.49}]O_3$ was weighed and used (the detailed results of evaluation are shown in FIG. 11). Employing $MnO_2$ (purity 99.8%), $Al_2O_3$ (purity 99.99%), and $Cr_2O_3$ (purity 99.8%) of chemical reagent grade, the addition is weighed in a range shown in Table 1.

TABLE 1

| Compound | Range of Addition (wt. %) |
| --- | --- |
| $MnO_2$ | 0~1.5 |
| $Al_2O_3$ | 0~2.0 |
| $Cr_2O_3$ | 0~0.5 |

The weighed powder is mixed in a wet process in a ball mill for 24 hours by using zirconia balls of 10 mmΦ and a polyethylene pot. The wet-mixed powder is hydrated and dried, and then calcined for 2 hours at the temperature of 1,123 K in the atmosphere. The calcined powder is roughly ground in a mortar, and pulverized in a medium stirring mill by using zirconia balls of 2 mmΦ to prepare calcined powder. The mean particle size of the calcined powder obtained by this pulverization is 0.24 μm. The pulverized powder dries, and a slight amount of organic binder is added. The mixture is granulated, and molded at the pressure of 70 MPa. This molded element is put on a platinum plate, covered with a magnesia container to suppress evaporation of PbO, and put in an electric oven to remove the binder at the temperature of 973 K. The temperature rises at a rate of 250 K per hour, and the element is baked for 1 hour at the temperature of 1373 K to 1423 K.

After baking, the piezoelectric element is cut into a plate of 15 mm long×2 mm wide×0.85 mm thick, and a slit is cut in the middle of the width of the plate in the longitudinal direction to obtain a tuning fork structure. After polishing the tuning fork structure, silver paste is applied on both sides of the plate to obtain electrodes by baking at 1033 K. This tuning fork structure in a plate form is dipped into silicone oil at the temperature of 383 K, and a DC electric field of 4 MV/m is applied for 0.5 hour between the electrodes so as to apply an electric field in the thickness direction to polarize the structure thereby. After polarization, the silver electrode is removed by polishing. In this series of processes, samples of tuning fork element 1 made of various compositions are prepared.

Figure 2:
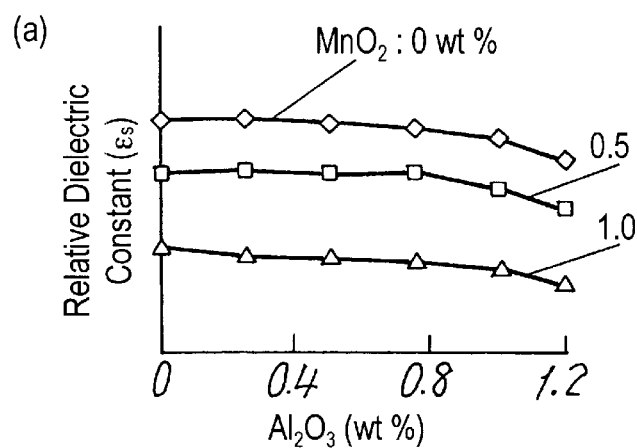
FIG. 2 is an electric and mechanical characteristic diagram of the tuning fork element.
Figure 2:
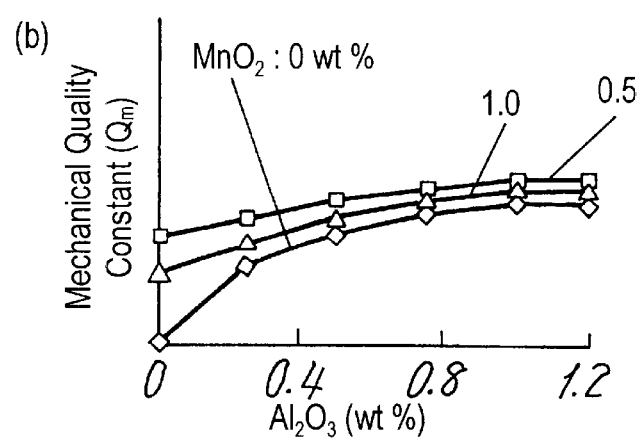
Figure 2:
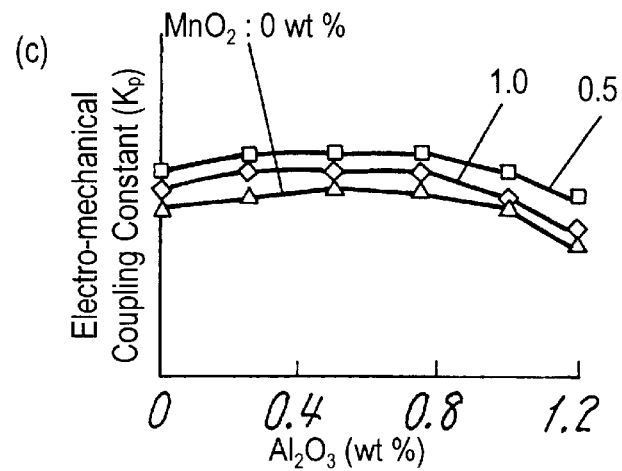

FIG. 2 is an electric and mechanical characteristic diagram by varying the content of $Al_2O_3$ from 0 to 1.2 wt. %, and the content of $MnO_2$ from 0 to 1.0 wt. % without adding $Cr_2O_3$ in the samples. FIG. 2(a) through (c) respectively show a relative dielectric constant ($\in_s$), a mechanical quality coefficient (Qm), and an electromechanical coupling coefficient (Kp).

In FIGS. 2(a) through (c), when the contents of $MnO_2$ and $Al_2O_3$ are 0 wt. %, Qm is about 100. It, however, seems to be an influence of impurities contained in the materials. It may be also considered that Qm slightly increases by adding $MnO_2$, i.e., it seems that adding $MnO_2$ canceled the influence of donor impurities contained originally in the materials.

When the content of $MnO_2$ is up to 0.5 wt. %, Qm and Kp increase. It is suggested that a linear-operating-region is maintained up to a large input electric power, and also, the sensitivity is heightened.

Adding $MnO_2$ is also effective to lessen the influence of the baking atmosphere on fluctuations of characteristics.

Further, $MnO_2$ is solidified in a form of trivalent ion as a donor, raises an insulation resistance, and hence is effective to decrease an undesired signal from an angular velocity sensor.

However, when the content of $MnO_2$ exceeds 1.0 wt. %, $\in_s$ and Kp drop suddenly, which is not preferred as a piezoelectric characteristic.

Therefore, comprehensively judging the characteristic items of $\in_s$, Qm, and Kp, the content of $MnO_2$ of 0.5 wt % is most preferable.

Incidentally, if the content of $Al_2O_3$ exceeds 1.0 wt. %, $\in_s$ and Kp decline significantly, which is not preferable.

Figure 3:
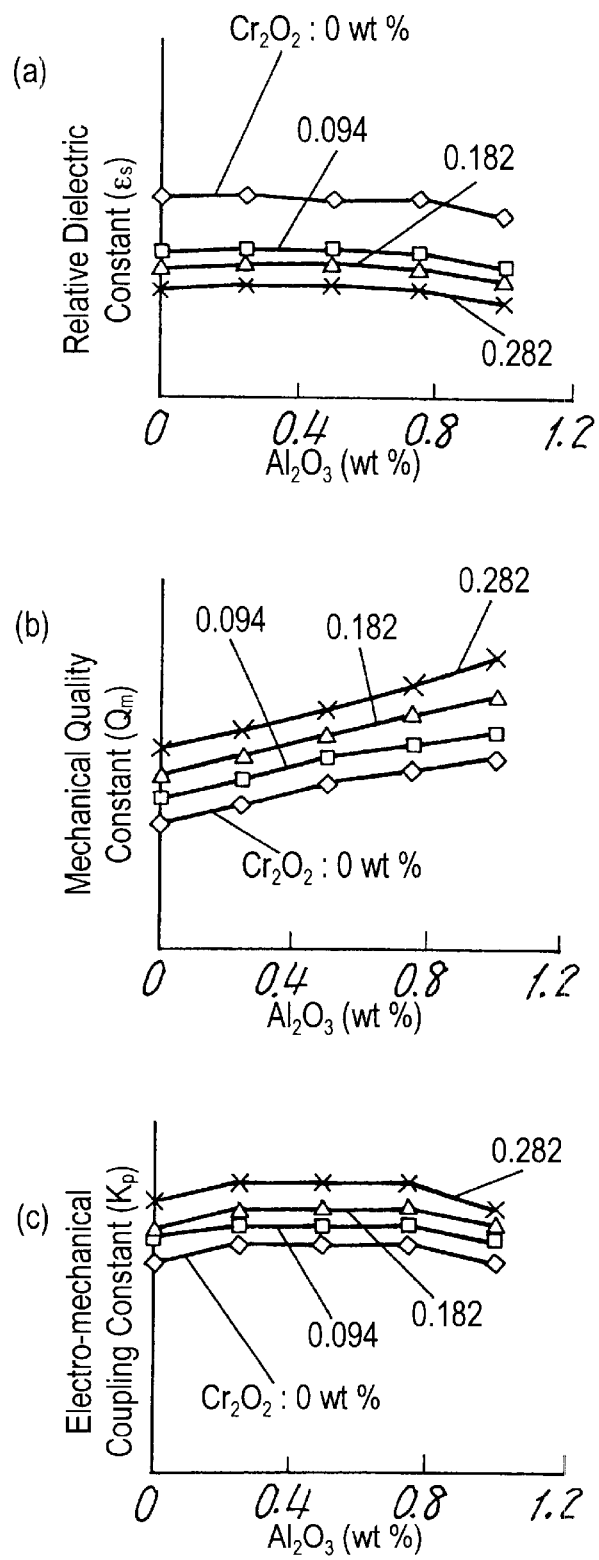
FIG. 3 is an electric and mechanical characteristic diagram of the tuning fork element.

FIG. 3 is an electric and mechanical characteristic diagram by varying the content of $Al_2O_3$ from 0 to 0.1 wt. %, and the content of $Cr_2O_3$ from 0 to 0.282 wt. %, while fixing the content of $MnO_2$ at 0.5 wt. % in the samples. FIGS. 3(a), (b), and (c) respectively show $\in_s$, Qm, and Kp.

In FIGS. 3(a) through (c), by increasing the content of $Al_2O_3$, Kp and $\in_s$ do not change significantly, but Qm increases notably. Therefore, even if driven up to a large amplitude, a linear-operation is maintained, and it is simultaneously suggested that a sensitivity is heightened.

However, when the content of $Al_2O_3$ exceeds 1.0 wt. %, Kp and $\in_s$ decrease, which is not preferable.

By increasing addition of $Cr_2O_3$, Kp and Qm increase, but $\in_s$ tends to decline slightly. It suggests that the increase of content of $Cr_2O_3$ causes to increase Qm, to pull up the threshold for starting softening phenomenon accompanied by further increase of an amplitude of piezoelectric element, and to pull up a starting level of a nonlinear-operation. It suggests to maintain a linear-operation even if driven at a larger amplitude, and achieve a higher sensitivity.

However, when the content of $Cr_2O_3$ exceeds 0.282 wt. %, Kp drops suddenly, and $\in_s$ further declines, which is not preferable. Referring an example of an evaluation result of Qm from the above results, when the content of $Al_2O_3$ is 1.0 wt. % and the content of $Cr_2O_3$ is 0.282 wt. %, Qm is 4,750.

Therefore, judging comprehensively characteristic items $\in_s$, Qm, and Kp, the content of $Cr_2O_3$ is 0.282 wt. % or less preferably, and the content of $Al_2O_3$ is 1.0 wt. % or less.

Figure 4:
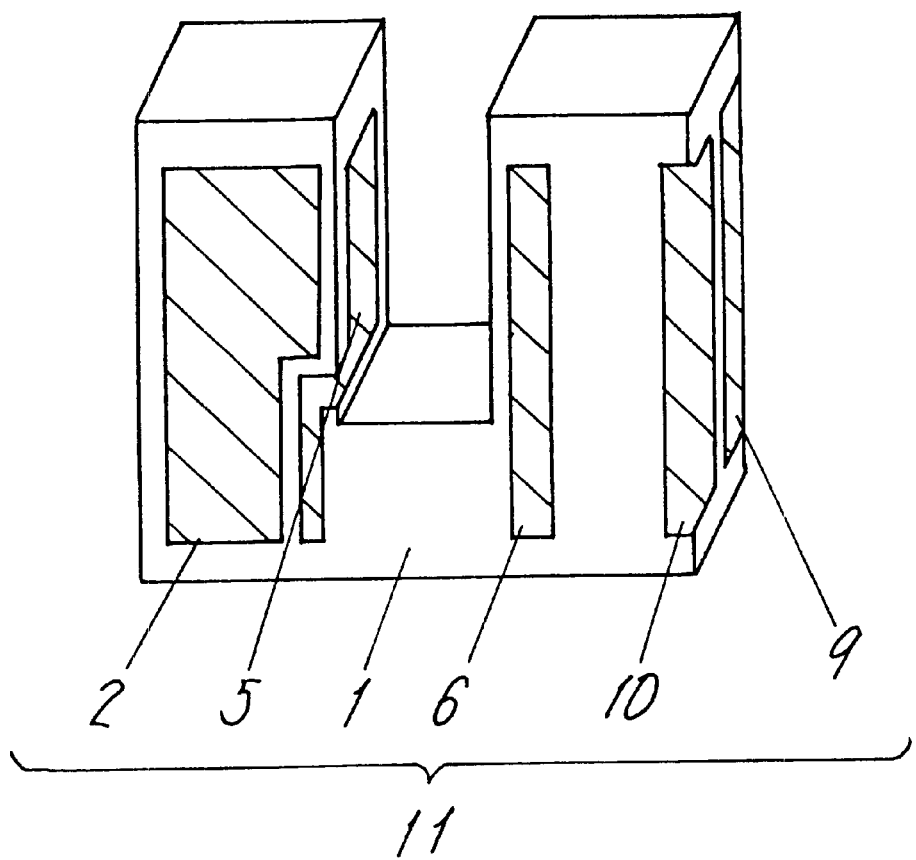
FIG. 4 is a perspective view of the tuning fork element for explaining an electrode configuration attached on the tuning fork element.

FIG. 4 shows a perspective view of the tuning fork for explaining the electrode configuration disposed in tuning fork element 1 in the composition as shown in Table 2 among the above materials.

TABLE 2

| Sample | Additive (wt %) | | |
|---|---|---|---|
| | $MnO_2$ | $Al_2O_3$ | $Cr_2O_3$ |
| A | 0.5 | 1.0 | 0.282 |
| B | 0.5 | 0 | 0.282 |
| C | 0.5 | 1.0 | 0 |
| D | 0.5 | 0 | 0 |
| E | 0.1 | 1.0 | 0.282 |
| F | 0.1 | 0 | 0.282 |
| G | 0.1 | 1.0 | 0 |
| H | 0.1 | 0 | 0 |
| I | 1.0 | 1.0 | 0.282 |
| J | 1.0 | 0 | 0.282 |
| K | 1.0 | 1.0 | 0 |
| L | 1.0 | 0 | 0 |

In FIG. 4, reference numerals 2 and 5 show driving electrodes, reference numeral 6 shows a monitor electrode, reference numerals 9 and 10 show detecting electrodes, and reference numeral 11 show a tuning fork. Driving electrodes 2, 5, monitor electrode 6, and detecting electrodes 9, 10 are all formed by vapor deposition of gold.

Figure 5:
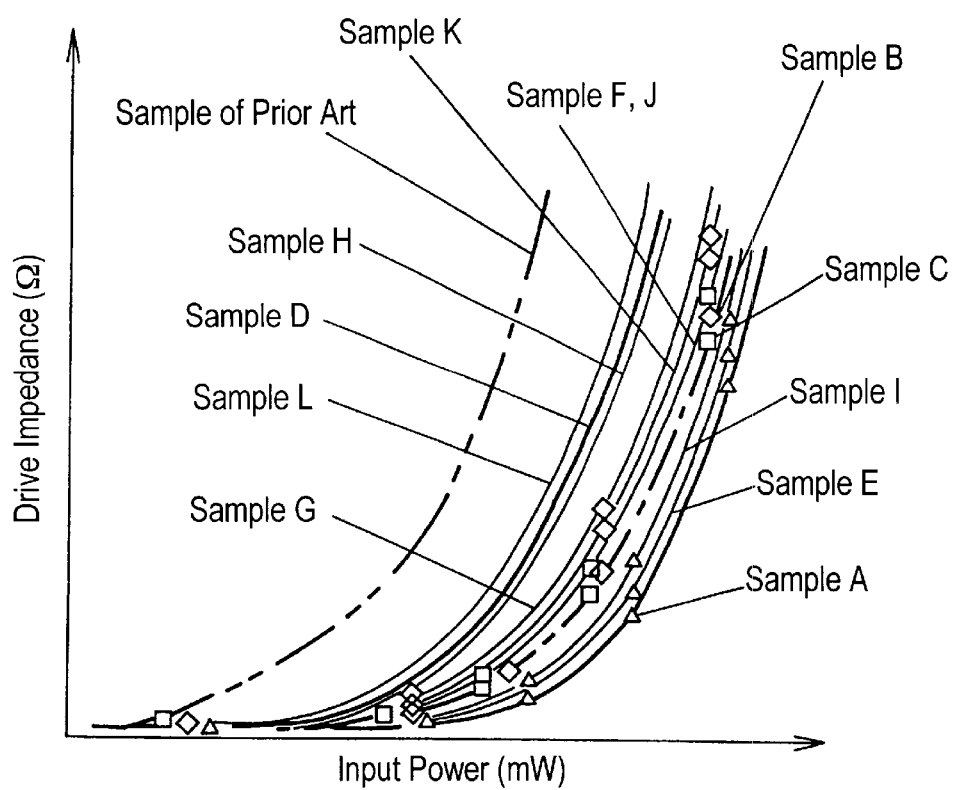
FIG. 5 is a characteristic diagram showing the relation of an input power and a driving impedance of the tuning fork element.

FIG. 5 is a characteristic diagram showing the relation between an input electric power (axis of abscissas) and a driving impedance (axis of ordinates) of tuning fork 11 having the composition as shown in Table 2, together with evaluation results of the prior art. As shown in FIG. 5, samples A, B, C, D, E, F, G, H, I, J, K, and L, as compared with the conventional example (prior art), can feed a larger input electric power for the same driving impedance, and at the same time maintain a linear-region up to a large input electric power, and samples A, B, C, E, F, G, I, J, and K, as compared with samples D, H, and L, also can. Among them, a particularly notable tendency is noted in sample A. It also suggests that sample A can realize an angular velocity sensor with a higher sensitivity.

Figure 6:
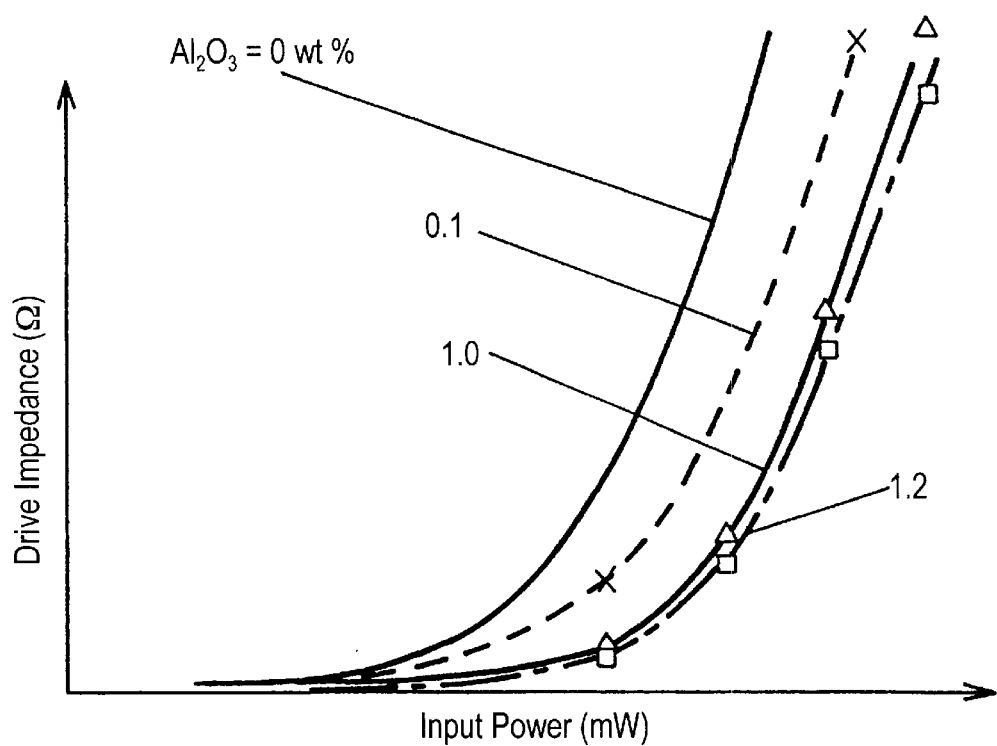
FIG. 6 is a characteristic diagram showing the relation of an input power and a driving impedance of the tuning fork element.

FIG. 6 is a characteristic diagram showing the relation between an input electric power (axis of abscissas) and a driving impedance (axis of ordinates) of tuning fork 11, in which the content of $Al_2O_3$ changes to 0, 0.1, 1.0, and 1.2 wt. % while the content of $MnO_2$ fixed at 0.5 wt. % without adding $Cr_2O_3$ in the same samples. In FIG. 6, as the content of $Al_2O_3$ increases, it suggests that a larger input electric power can be supplied at the same driving impedance, and that the linear-region can be maintained up to a large input electric power. It also suggests that the angular velocity sensor with a high sensitivity is realized. However, as mentioned in FIG. 2 and FIG. 3, when the content of $Al_2O_3$ exceeds 1.0 wt. %, Kp and $\in_s$ drop. In particular, Kp drops significantly, and therefore it is not preferable that the content of $Al_2O_3$ exceeds 1.0 wt. %. In this embodiment, the content of $Al_2O_3$ may be less than 1.0 wt. %, but more preferably it is in a range of 0.1 to 1.0 wt. %.

Figure 7:
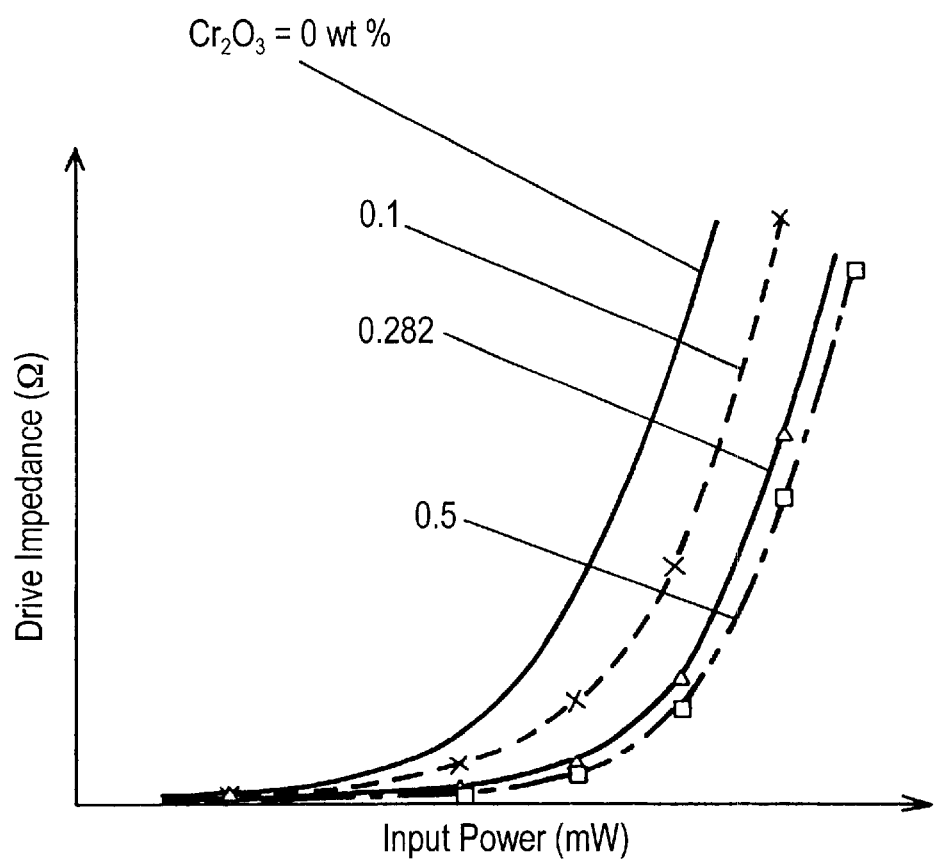
FIG. 7 is a characteristic diagram showing the relation of an input power and a driving impedance of the tuning fork element.

FIG. 7 is a characteristic diagram showing the relation between an input electric power (axis of abscissas) and a driving impedance (axis of ordinates) of tuning fork 11, in which the content of $Cr_2O_3$ changes to 0, 0.1, 0.282, and 0.5 wt. % while the content of $MnO_2$ is fixed at 0.5 wt. % without adding $Al_2O_3$ in the same samples. In FIG. 7, as the content of $Cr_2O_3$ increases, it suggests that a larger input electric power can be supplied at the same driving impedance, and that the linear-region can be maintained up to a large input electric power. It also suggests that the angular velocity sensor with a high sensitivity is realized. However, as mentioned in FIG. 3, when the content of $Cr_2O_3$ exceeds 0.282 wt. %, Kp drops suddenly, and therefore it is not preferable that the content of $Cr_2O_3$ exceeds 0.282 wt. %. In this embodiment, the content of $Cr_2O_3$ may be less than 0.282 wt. %, but more preferably it is in a range of 0.1 to 0.282 wt. %.

Figure 8:
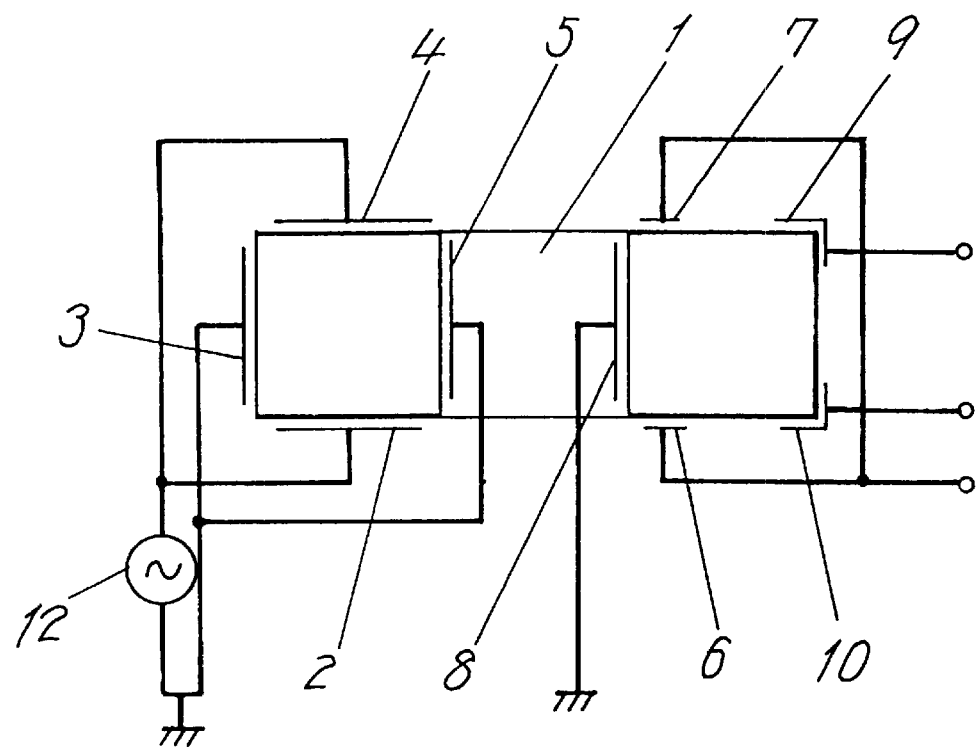
FIG. 8 is a schematic structural diagram for explaining the electrode configuration and a wiring connection for connecting the tuning fork element to a processing circuit.

FIG. 8 is a schematic structural diagram explaining the electrode configuration for connecting tuning fork 11 shown in FIG. 4 to the processing circuit for driving and detecting, and its wiring relation. In FIG. 8, reference numerals 3 and 4 show driving electrodes, reference numeral 7 shows a monitor electrode, reference numeral 8 shows a grounding electrode, and reference numeral 12 shows a driving source. In FIG. 8, the same components as in FIG. 4 are identified with same reference numerals, and detailed description is omitted.

Figure 9:
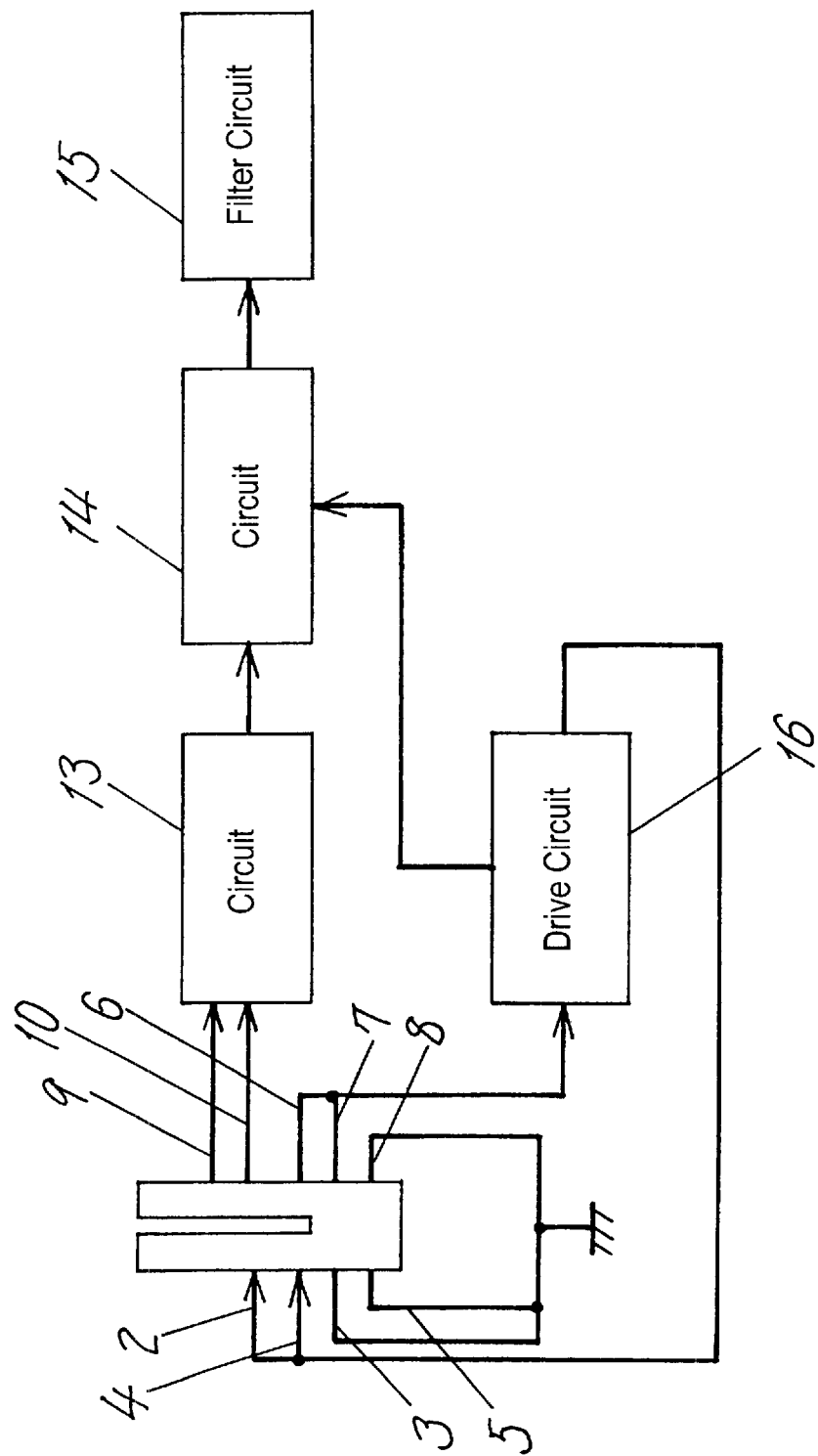
FIG. 9 is a block diagram of an angular velocity sensor having the tuning fork element connected to the processing circuit.

FIG. 9 is a block diagram of an angular velocity sensor having tuning fork 11 shown in FIG. 4 connected to the processing circuit in the wiring connection shown in FIG. 8.

In FIG. 9, reference numeral 13 show a detecting circuit connected to detecting electrodes 9 and 10 for amplifying the detection signals, reference numeral 14 shows a detecting circuit for detecting the output signal of detecting circuit 13, reference numeral 15 shows a filter circuit for removing a driving signal component from the output signal of detecting circuit 14, and reference numeral 16 shows a driving circuit connected to driving electrodes 2, 4, and monitor electrodes 6, 7.

The operation of the angular velocity sensor in this embodiment will be explained by referring to FIG. 9. Signals from monitor electrodes 6, 7 are fed into driving circuit 16, and the output signal of driving circuit 16 is fed back to driving electrodes 2, 4, so that the tuning fork is driven by self-excitation. The angular velocity signals detected by detecting electrodes 9, 10 are differentially fed into detecting circuit 13 and amplified. By detecting the amplified signal with using the output signal of driving circuit 16, a detection signal is obtained. The detection signal is fed into filter circuit 15 of next stage, and a driving signal component is removed from the signal, so that only the angular velocity component is finally detected.

Figure 10:
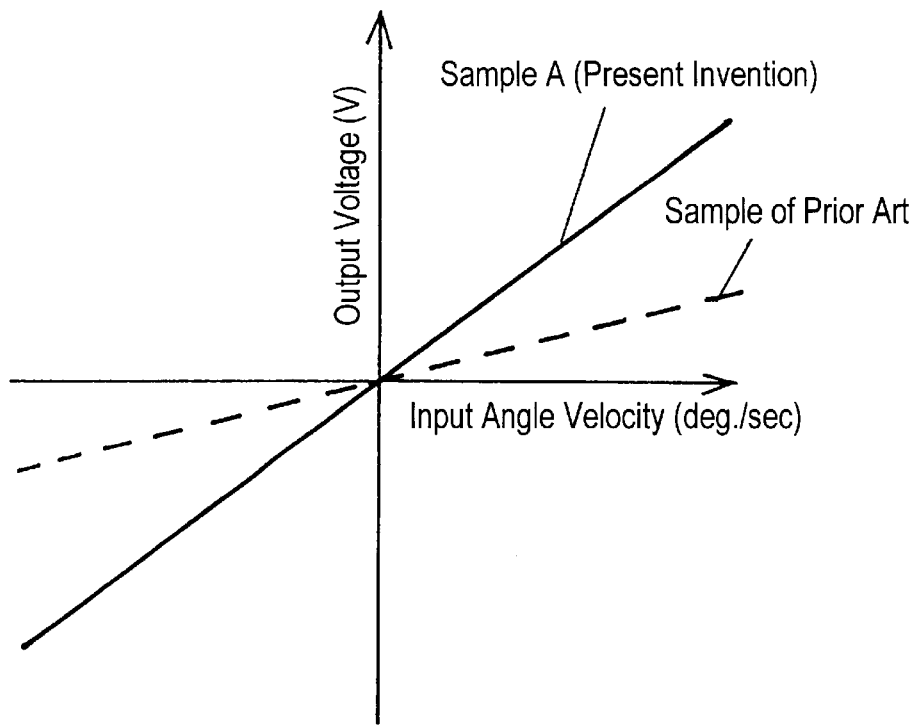
FIG. 10 is a sensitivity characteristic diagram of the angular velocity sensor in the embodiment.

FIG. 10 is a sensitivity characteristic diagram evaluating an output voltage versus an input angular velocity of sample A shown in Table 2 with using the processing circuit shown in FIG. 9, together with the conventional sample (prior art). In FIG. 10, the axis of abscissas denotes the input angular velocity, and the axis of ordinates represents the output voltage. From FIG. 10, it is known that sample A has an extremely enhanced sensitivity as compared with the conventional sample (prior art). Table 3 shows an evaluation result of a sensitivity characteristics in other samples than sample A.

TABLE 3

| Addition (wt. %) | | | |
| --- | --- | --- | --- |
| $MnO_2$ | $Al_2O_3$ | $Cr_2O_3$ | Ratio of sensitivity to prior art |
| 0.5 | 0 | 0 | 1.5 |
| 0.5 | 0.1 | 0 | 2.0 |
| 0.5 | 1.0 | 0 | 2.5 |
| 0.5 | 2.0 | 0 | 2.6 |
| 0.5 | 1.0 | 0.1 | 2.6 |
| 0.5 | 1.0 | 0.282 | 3.0 |
| 0.5 | 1.0 | 0.5 | 3.0 |
| 0.5 | 0 | 0.1 | 1.6 |
| 0.5 | 0 | 0.282 | 2.0 |
| 0.5 | 0 | 0.5 | 2.2 |
| 0.5 | 0.1 | 0.282 | 2.2 |

TABLE 3-continued

| Addition (wt. %) | | | |
| --- | --- | --- | --- |
| $MnO_2$ | $Al_2O_3$ | $Cr_2O_3$ | Ratio of sensitivity to prior art |
| 0.5 | 0.1 | 0.1 | 1.8 |
| 0.5 | 0.1 | 0.5 | 2.0 |
| 0.5 | 2.0 | 0.1 | 2.7 |
| 0.5 | 2.0 | 0.282 | 2.9 |
| 0.5 | 2.0 | 0.5 | 3.0 |
| 0.1 | 0 | 0 | 1.4 |
| 0.1 | 0.1 | 0 | 1.8 |
| 0.1 | 1.0 | 0 | 2.2 |
| 0.1 | 2.0 | 0 | 2.4 |
| 0.1 | 1.0 | 0.1 | 2.4 |
| 0.1 | 1.0 | 0.282 | 2.7 |
| 0.1 | 1.0 | 0.5 | 2.7 |
| 0.1 | 0 | 0.1 | 1.4 |
| 0.1 | 0 | 0.282 | 1.7 |
| 0.1 | 0 | 0.5 | 1.9 |
| 0.1 | 0.1 | 0.282 | 1.9 |
| 0.1 | 0.1 | 0.1 | 1.5 |
| 0.1 | 0.1 | 0.5 | 1.7 |
| 0.1 | 2.0 | 0.1 | 2.4 |
| 0.1 | 2.0 | 0.282 | 2.6 |
| 0.1 | 2.0 | 0.5 | 2.6 |
| 1.0 | 0 | 0 | 1.4 |
| 1.0 | 0.1 | 0 | 1.7 |
| 1.0 | 1.0 | 0 | 2.2 |
| 1.0 | 2.0 | 0 | 2.4 |
| 1.0 | 1.0 | 0.1 | 2.5 |
| 1.0 | 1.0 | 0.282 | 2.8 |
| 1.0 | 1.0 | 0.5 | 2.8 |
| 1.0 | 0 | 0.1 | 1.5 |
| 1.0 | 0 | 0.282 | 1.8 |
| 1.0 | 0 | 0.5 | 1.8 |
| 1.0 | 0.1 | 0.282 | 1.9 |
| 1.0 | 0.1 | 0.1 | 1.6 |
| 1.0 | 0.1 | 0.5 | 1.7 |
| 1.0 | 2.0 | 0.1 | 2.4 |
| 1.0 | 2.0 | 0.282 | 2.6 |
| 1.0 | 2.0 | 0.5 | 2.7 |

As shown in Table 3, the sensitivity is 1.4 times or more as high as the prior art. This performance is same as suggested by the results in FIG. 2 through FIG. 7.

Table 4 shows evaluation results of a sensitivity characteristic in an example having a perovskite crystal structure expressed as $ABO_3$, which is other than the compositions mentioned so far.

TABLE 4

| Composition | Addition (wt. %) | | | Ratio of sensitivity to prior art |
| --- | --- | --- | --- | --- |
| | $MnO_2$ | $Al_2O_3$ | $Cr_2O_3$ | |
| $Pb(Cd_{1/3}Nb_{2/3})O_3$ | 0.5 | 1.0 | 0.282 | 3.0 |
| | 0.5 | 1.0 | 0 | 2.5 |
| | 0.5 | 0.0 | 0.282 | 2.0 |
| $Pb(Fe_{1/3}Nb_{2/3})O_3$ | 0.5 | 1.0 | 0.282 | 3.0 |
| | 0.5 | 1.0 | 0 | 2.5 |
| | 0.5 | 0.0 | 0.282 | 2.0 |
| $Pb(Sc_{1/3}Ta_{2/3})O_3$ | 0.5 | 1.0 | 0.282 | 3.0 |
| | 0.5 | 1.0 | 0 | 2.5 |
| | 0.5 | 0.0 | 0.282 | 2.0 |
| $Pb(Zn_{1/3}Nb_{2/3})O_3$ | 0.5 | 1.0 | 0.282 | 3.0 |
| | 0.5 | 1.0 | 0 | 2.5 |
| | 0.5 | 0.0 | 0.282 | 2.0 |
| $Pb(Yb_{1/3}Nb_{1/2})O_3$ | 0.5 | 1.0 | 0.282 | 3.0 |
| | 0.5 | 1.0 | 0 | 2.5 |
| | 0.5 | 0.0 | 0.282 | 2.0 |
| $Pb(Yb_{1/2}Ta_{1/2})O_3$ | 0.5 | 1.0 | 0.282 | 3.0 |
| | 0.5 | 1.0 | 0 | 2.5 |
| | 0.5 | 0.0 | 0.282 | 2.0 |

TABLE 4-continued

| Composition | Addition (wt. %) | | | Ratio of sensitivity |
|---|---|---|---|---|
| | $MnO_2$ | $Al_2O_3$ | $Cr_2O_3$ | to prior art |
| $Pb(Lu_{1/2}Nb_{1/2})O_3$ | 0.5 | 1.0 | 0.282 | 3.0 |
| | 0.5 | 1.0 | 0 | 2.5 |
| | 0.5 | 0.0 | 0.282 | 2.0 |
| $Pb(In_{1/2}Nb_{1/2})O_3$ | 0.5 | 1.0 | 0.282 | 3.0 |
| | 0.5 | 1.0 | 0 | 2.5 |
| | 0.5 | 0.0 | 0.282 | 2.0 |
| $Pb(Cd_{1/3}W_{1/2})O_3$ | 0.5 | 1.0 | 0.282 | 3.0 |
| | 0.5 | 1.0 | 0 | 2.5 |
| | 0.5 | 0.0 | 0.282 | 2.0 |
| $Pb(Mn_{1/2}W_{1/2})O_3$ | 0.5 | 1.0 | 0.282 | 3.0 |
| | 0.5 | 1.0 | 0 | 2.5 |
| | 0.5 | 0.0 | 0.282 | 2.0 |
| $Pb(Zn_{1/2}W_{1/2})O_3$ | 0.5 | 1.0 | 0.282 | 3.0 |
| | 0.5 | 1.0 | 0 | 2.5 |
| | 0.5 | 0.0 | 0.282 | 2.0 |

The results shown in Table 4 are also of the same level as the results in Table 3, and it is suggested same as in FIG. 2 through FIG. 7 in the samples having a perovskite crystal structure expressed as $ABO_3$ in these compositions.

FIG. 11 is a temperature characteristic diagram evaluating a temperature characteristic of an output voltage (sensitivity) shown in FIG. 10. In FIG. 11, the axis of abscissas represents the temperature, and the axis of ordinates represents the output voltage. As known from FIG. 11, sample A has smaller fluctuation of the output voltage (sensitivity) against temperature than the conventional sample (prior art). Other samples than sample A also has smaller fluctuation of the output voltage (sensitivity) against temperature than the conventional sample (prior art). However, from the viewpoint of a temperature characteristics, the composition of $Pb[(Zn_{1/3}Nb_{2/3})_xZr_yTi_z]O_3$ (X+Y+Z=1) is preferred, and, in particular, $Pb[(Zn_{1/3}Nb_{2/3})_{0.125}Zr_{0.385}Ti_{0.49}]O_3$ is most preferred.

In this embodiment, sample A, which has a perovskite crystal structure expressed as $ABO_3$, $Pb[(Zn_{1/3}Nb_{2/3})_{0.125}Zr_{0.385}Ti_{0.49}]O_3$ and contain 0.5 wt. % of $MnO_2$, 1.0 wt. % of $Al_2O_3$, and 0.282 wt. % of $Cr_2O_3$, is most preferable from the viewpoint of a comprehensive characteristic as the angular velocity sensor (in particular, from the viewpoint of a linear operation at a large amplitude input). In the explanation of the embodiment, mainly, $MnO_2$ is contained at 0.5 wt. %, but not limited to this amount, the content may be properly selected in a range of 0.1 to 1.0 wt. % depending on a desired characteristics.

In the embodiment, an example of a piezoelectric element having a perovskite crystal structure expressed as $Pb[(Zn_{1/3}Nb_{2/3})_{0.125}Zr_{0.385}Ti_{0.49}]O_3$ is explained, but the piezoelectric element of a perovskite crystal structure expressed as $ABO_3$ may be also used to achieve the technical concept of the invention by adding $MnO_2$ in a range of 0.1 to 1.0 wt. %.

Industrial Applicability

According to the invention, a vibrator, which works as an inertia transducer by vibration and a Corioli's force detector, comprises a piezoelectric element having a perovskite crystal structure expressed as $ABO_3$ and includes 0.1 to 1.0 wt. % of $MnO_2$, and thanks to this structure, vibration which is close to a linear-operation for a large amplitude input is obtained, and has a high sensitivity at the same time.

What is claimed is:

1. An angular velocity sensor comprising a vibrator comprising a piezoelectric element having a perovskite crystal structure expressed as $ABO_3$, wherein said piezoelectric element comprises 0.1 wt. %–2.0 wt. % of $Al_2O_3$, 0.1 wt. %–0.5 wt. % of $Cr_2O_3$, and 0.1 wt. %–1.0 wt. % of $MnO_2$.

2. The angular velocity sensor of claim 1, wherein said piezoelectric element includes 0.1 wt. %–1.0 wt. % of $Al_2O_3$.

3. The angular velocity sensor of claim 1, wherein said piezoelectric element includes 0.1 wt. %–0.282 wt. % of $Cr_2O_3$.

4. The angular velocity sensor of claim 1, wherein the perovskite crystal structure is $Pb[(Zn_{1/3}Nb_{2/3})_xZr_yTi_z]O_3$ and wherein x+y+z=1.

5. The angular velocity sensor of claim 4, wherein the perovskite crystal structure is $Pb[(Zn_{1/3}Nb_{2/3})_xZr_yTi_z]O_3$ and wherein x=0.125, y=0.385 and z=0.49.

6. The angular velocity sensor of claim 5, wherein said piezoelectric element includes 0.5 wt. % of $MnO_2$.

* * * * *